(12) United States Patent
Stefani et al.

(10) Patent No.: US 9,488,303 B2
(45) Date of Patent: Nov. 8, 2016

(54) PIPE COUPLING

(71) Applicants: SAINT-GOBAIN PERFORMANCE PLASTICS FRANCE, Charny (FR); SAINT-GOBAIN PERFORMANCE PLASTICS CORPORATION, Solon, OH (US)

(72) Inventors: Yves Stefani, Vanves (FR); Roland Lucotte, Bussières (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 14/643,826

(22) Filed: Mar. 10, 2015

(65) Prior Publication Data

US 2015/0252933 A1 Sep. 10, 2015

(30) Foreign Application Priority Data

Mar. 10, 2014 (FR) .................................... 14 51948

(51) Int. Cl.
| F16L 9/00 | (2006.01) |
| F16L 25/00 | (2006.01) |
| F16L 15/04 | (2006.01) |
| F16L 9/147 | (2006.01) |

(52) U.S. Cl.
CPC ............ F16L 25/0018 (2013.01); F16L 15/04 (2013.01); F16L 9/147 (2013.01)

(58) Field of Classification Search
CPC ......... E21B 17/042; F16L 47/16; F16L 9/14; F16L 58/182; F16L 15/001; Y10S 138/02

USPC ................. 138/109, 143, 145; 285/294.1, 53
See application file for complete search history.

(56) References Cited

U.S. PATENT DOCUMENTS

| 393,120 | A | | 11/1888 | Norotn et al. |
| 1,542,940 | A | | 6/1925 | Hughes |
| 2,070,291 | A | | 2/1937 | McHugh |
| 2,409,865 | A | | 10/1946 | Jewell |
| 2,739,018 | A | | 3/1956 | Collett |
| 3,047,937 | A | | 8/1962 | De Vecchi |
| 3,217,077 | A | * | 11/1965 | Cocke .................... B28B 21/56 138/109 |
| 3,229,998 | A | | 1/1966 | Pennington |
| 3,253,841 | A | | 5/1966 | Ahmad |
| 3,656,769 | A | | 4/1972 | Jelinek et al. |
| 3,702,199 | A | | 11/1972 | Brooks et al. |
| 3,771,817 | A | | 11/1973 | Schnabel |

(Continued)

FOREIGN PATENT DOCUMENTS

| EP | 0002959 B1 | 9/1981 |
| EP | 0079702 A1 | 5/1983 |

(Continued)

OTHER PUBLICATIONS

International Search Report for PCT/US2015/019717 dated May 29, 2015, 1 page.

*Primary Examiner* — Patrick F Brinson
(74) *Attorney, Agent, or Firm* — Abel Law Group, LLP; Chi Suk Kim (57) ABSTRACT

A tubular comprising a substrate having a first end, a second end, and an axial bore extending between the first and second ends, and an outer polymer layer disposed on the substrate, wherein a first axial end of the outer polymer layer extends beyond the first end of the substrate.

20 Claims, 10 Drawing Sheets

(56) References Cited

U.S. PATENT DOCUMENTS

| | | | |
|---|---|---|---|
| 3,771,820 A | 11/1973 | Hoss, Sr. et al. | |
| 3,905,623 A | 9/1975 | Cassel | |
| 4,260,181 A | 4/1981 | Curtin | |
| 4,469,357 A * | 9/1984 | Martin | B29C 61/0608 138/89 |
| 4,506,983 A * | 3/1985 | Marr | B01F 9/06 366/192 |
| 4,606,953 A | 8/1986 | Suzuki et al. | |
| 4,735,444 A | 4/1988 | Skipper | |
| 5,007,666 A | 4/1991 | Kyfes | |
| 5,224,738 A | 7/1993 | Taga | |
| 5,333,650 A * | 8/1994 | Folkman | F16L 33/34 138/103 |
| 5,406,983 A * | 4/1995 | Chambers | E21B 17/042 138/109 |
| 5,709,917 A | 1/1998 | Carmien | |
| 5,823,581 A | 10/1998 | Coppolo | |
| 5,895,695 A * | 4/1999 | Rowley | B29C 45/14598 138/109 |
| 5,954,371 A * | 9/1999 | Koke | B29C 45/14622 138/109 |
| 6,312,024 B1 | 11/2001 | Dutilleul et al. | |
| 7,025,393 B2 | 4/2006 | Amedure et al. | |
| 7,107,662 B1 | 9/2006 | Levario | |
| 7,252,310 B2 | 8/2007 | Amedure et al. | |
| 7,475,919 B2 | 1/2009 | Hiernard et al. | |
| 8,104,796 B2 | 1/2012 | Stefani et al. | |
| 8,282,136 B2 | 10/2012 | Vandal et al. | |
| 8,419,075 B2 * | 4/2013 | Neame | A61M 16/0427 264/262 |
| 8,523,243 B2 | 9/2013 | Geese et al. | |
| 2007/0210577 A1 | 9/2007 | Pollack et al. | |
| 2010/0038019 A1 | 2/2010 | Da Silveira et al. | |
| 2013/0082463 A1 | 4/2013 | Benson | |
| 2013/0113210 A1 | 5/2013 | Lund | |
| 2013/0168958 A1 | 7/2013 | Van Den Bergh et al. | |

FOREIGN PATENT DOCUMENTS

| | | |
|---|---|---|
| EP | 0082212 B1 | 2/1986 |
| EP | 0510803 B1 | 1/1997 |
| EP | 1350051 B1 | 8/2010 |
| EP | 2253876 A1 | 11/2010 |
| WO | 2011061704 A1 | 5/2011 |
| WO | 2013098546 A1 | 7/2013 |

* cited by examiner

PIPE COUPLING

CROSS-REFERENCE TO RELATED APPLICATION(S)

This application claims priority under 35 U.S.C. §119(e) to French Patent Application No. 1451948 entitled "PIPE COUPLING," by Yves Stefani, et al., filed Mar. 10, 2014, which is assigned to the current assignee hereof and incorporated herein by reference in its entirety.

FIELD OF THE DISCLOSURE

The present disclosure is related generally to pipe joints or pipe couplings.

RELATED ART

Traditionally, seals are used to prevent fluids from flowing between joints of rigid components, e.g., pipes. In particular examples, seals can be installed between flanges to limit fluid flow out of the pipes. The flanges typically extend radially outward from the pipe and are not suitable for particular applications which require translational movement of the pipe.

Accordingly, there exists a need for an improved pipe joint.

BRIEF DESCRIPTION OF DRAWINGS

The present disclosure may be better understood, and its numerous features and advantages made apparent to those skilled in the art by referencing the accompanying drawings.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the pipe coupling arts.

A tubular in accordance with one or more of the embodiments described herein can generally include a substrate having a first axial end, a second axial end, and an axial bore extending between the first and second axial ends. Moreover, the tubular can also include an outer polymer layer disposed on the substrate. Two or more tubulars can be joined together at axial ends to form a tubular assembly.

In particular embodiments, the outer polymer layers of adjacent tubulars can be joined so as to form a seal. In such a manner, the tubular assembly can be deployed in an environment having an external pressure greater than an internal pressure of the axial bore without ingress of an external fluid into the axial bore of the tubular assembly. In particular embodiments, the seal, as formed by the outer polymer layers of adjacent tubulars, can have a seal effectiveness, as measured by the effective sealing capability, that increases as the pressure external to the tubular increases relative to the pressure within the axial bore of the tubular assembly In particular embodiments, the tubular assembly defines an average outer diameter, wherein a maximum diameter of each tubular does not exceed 10% of the average diameter of the tubular assembly. In such a manner, the tubular assembly can be flangeless, or nearly flangeless. Flangeless tubular assemblies can operate in environments requiring longitudinal translation. Moreover, flangeless tubular assemblies can be secured together without the use of external fasteners extending between adjoining flanges of adjacent tubulars.

In a particular aspect, the tubular assembly as described herein can be used in a process of extracting oil from a subterranean formation. In this regard, at least two tubulars can be joined together and a heating member can be inserted into the tubulars. The heating member can be a heated coil, such as an induction coil. The heating member can be segmental or one piece. Upon energizing, the heating member can reduce a viscosity of a subterranean fluid, allowing extraction thereof.

Figure 1:
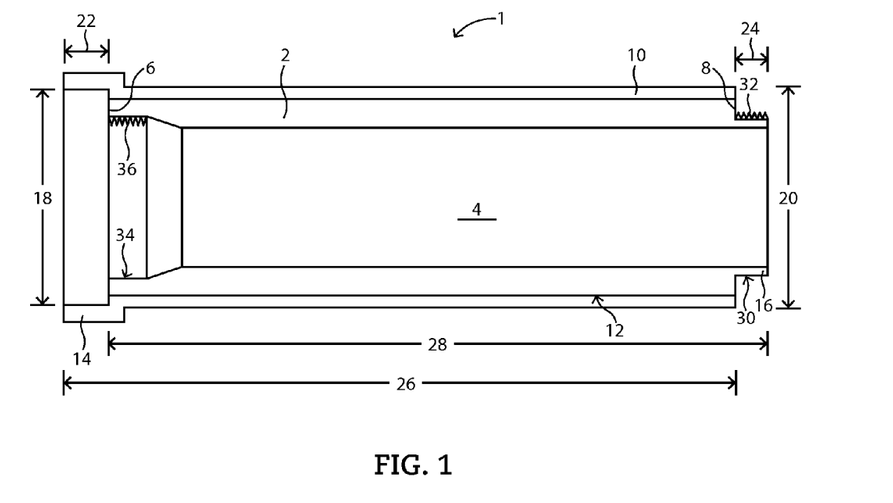
FIG. 1 includes a cross-sectional side view of a tubular in accordance with an embodiment.

Referring initially to FIG. 1, in a particular aspect, a tubular 1 can generally include a substrate 2 having an axial bore 4 extending between opposing axial ends 6 and 8, and an outer polymer layer 10 disposed on an outer surface 12 of the substrate 2.

In particular embodiments, the substrate 2 can comprise a metal. More specifically, the substrate 2 can comprise an aluminum. The outer polymer layer 10 can form a fluid barrier around an outer surface 12 of the substrate 2. As will be discussed in greater detail, the outer polymer layer 10 can form a barrier to prevent ingress of an external fluid into the axial bore 4 of a tubular assembly.

The outer polymer layer 10 can comprise a polymer, a polymer blend, or even a copolymer. While the outer polymer layer 10 can comprise one or more polymers, it may be particularly advantageous for the outer polymer layer 10 to comprise a thermoplastic. For example, the outer polymer layer 10 may comprise a fluoropolymer, such as, for example, a perfluoroalkoxy alkane (PFA), a polytetrafluoroethylene (PTFE), a polypropylene (PP), a fluorinated ethylene propylene (FEP), an ethylene-tetrafluoroethylene (ETFE), a poly-tetrafluoroethylene-perfluoropropylvinylether (MFA), a polyvinylidene fluoride (PVDF), an ethylene chlorotrifluoroethylene (ECTFE), a polychlorotrifluoroethylene (PCTFE), a tetrafluoroethylene-hexafluoropropylene-vinylidene fluoride (THV), or any combination thereof.

In particular embodiments, a plasticizer may be added to the outer polymer layer 10. Addition of the plasticizer can alter material properties of the outer polymer layer and may allow for easier manufacture and formation thereof.

It may be desirable in certain applications that the outer polymer layer 10 have a relatively uniform thickness, as measured in a radial direction normal to the outer surface 12 of the substrate 2. As used herein, the term "relatively uniform" refers to a maximum deviation of no greater than 10% of an average value thereof. In other embodiments, the outer polymer layer 10 can have a uniform thickness, as measured in a radial direction normal to the outer surface 12 of the substrate 2. As used herein, the term "uniform" refers to a maximum deviation of no greater than 1% of an average value thereof.

When viewed in cross section, the outer polymer layer 10 has a thickness, $T_{OPL}$, as measured in a radial direction. The substrate has a thickness, $T_S$, as measured in a radial direction. In certain embodiments, $T_S$ can be greater than $T_{OPL}$. For example, $T_{OPL}$ can be no greater than 0.99 $T_S$, such as no greater than 0.95 $T_S$, no greater than 0.75 $T_S$, or no greater than 0.50 $T_S$. Furthermore, $T_{OPL}$ can be no less than 0.05 $T_S$, such as no less than 0.25 $T_S$, or even no less than 0.45 $T_S$. Moreover, the $T_{OPL}$ can be within a range between and including any of the values described above, such as, for example, between 0.30 $T_S$ and 0.40 $T_S$.

In particular embodiments, $T_{OPL}$ can be no less than 0.1 mm, such as no less than 1.0 mm, or even no less than 5.0 mm. In other embodiments, $T_{OPL}$ can be no greater than 10 cm, no greater than 5 cm, or even no greater than 1 cm. In certain embodiments, $T_S$ can be no less than 0.1 mm, such as no less than 1.0 mm, or even no less than 5 cm. In other embodiments, $T_S$ can be no greater than 50 cm, such as no greater than 25 cm, or even no greater than 10 cm. Moreover the values of $T_S$ and $T_{OPL}$ can be within a range between and including any of the values described above.

In certain embodiments, the substrate 2 can comprise an engagement feature 16 extending longitudinally from the axial end 8 of the substrate 2. In further embodiments, the outer polymer layer 10 can extend from the axial end 8 of the substrate 2 along a length of the substrate 2, and extend longitudinally beyond axial end 6, so as to form an overhang feature 14. A person of ordinary skill in the art of pipe joints will understand that the overhang feature can be formed on either axial end of the tubular. In this regard, the overhang feature can extend from the axial end adjacent to the male threads of the tubular or the axial end adjacent to the female threads of the tubular.

Figure 16:
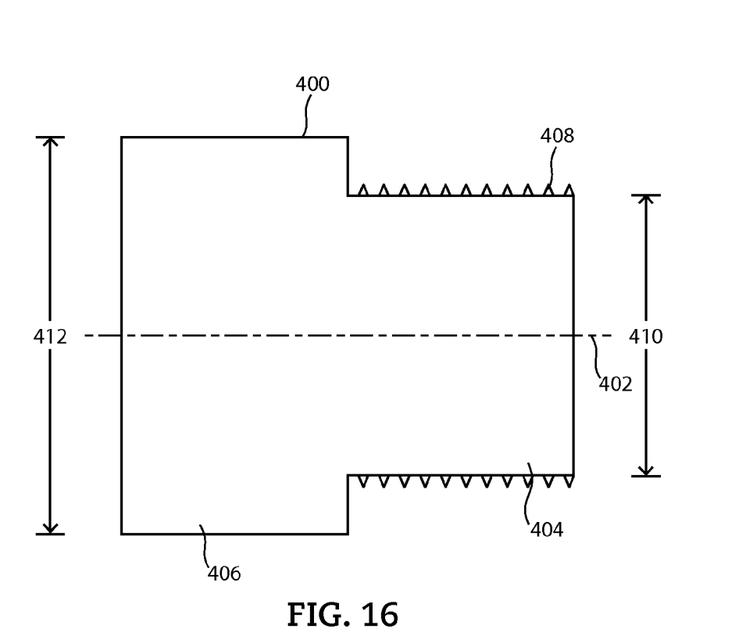
FIG. 16 includes a cross-sectional side view of a plug in accordance with an embodiment.
Figure 17:
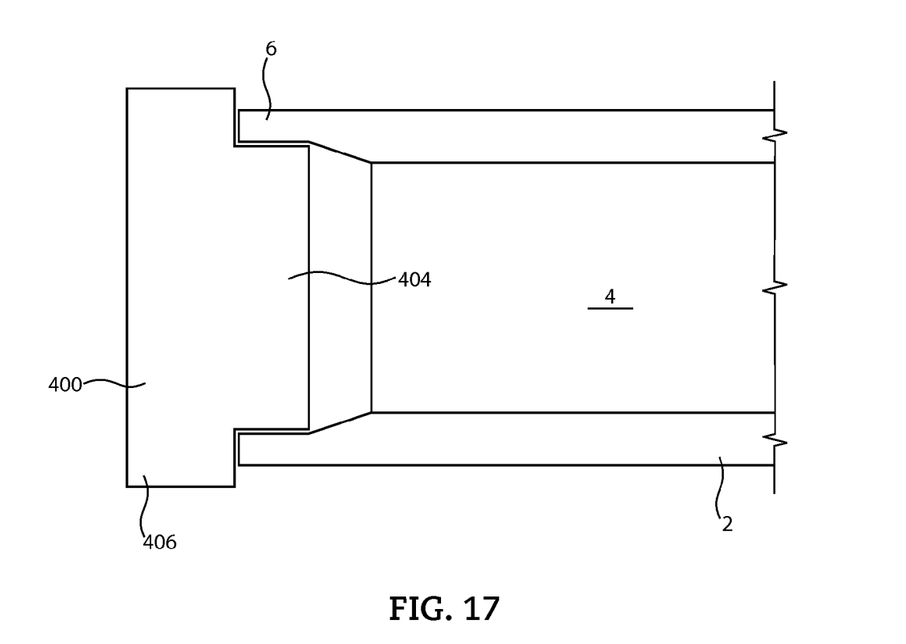
FIGS. 17 and 18 include cross-sectional side views of a tubular and a plug in accordance with embodiments herein.

In a particular aspect, the overhang feature 14 can be formed using a plug 400, such as, for example, illustrated in FIG. 16. The plug 400 can have a central axis 402, a first portion 404 having a diameter 410, and a second portion 406 having a diameter 412. An engagement component 408 can extend radially outward from the first portion 404. The engagement component 408 can comprise threads, a bayonet connection (not illustrated), or any other suitable method known in the art. Referring now to FIG. 17, the first portion 404 of the plug 400 can be inserted into the axial bore 4 until a surface of the second portion 406 of the plug 400 is adjacent to, or even abutting, the axial end 6 of the substrate 2. The plug 400 can be threadably engaged to the substrate 2. Alternatively, the plug can be secured to the substrate by a threaded or non threaded fastener, a bayonet connection, or any other suitable method known in the art.

Figure 18:
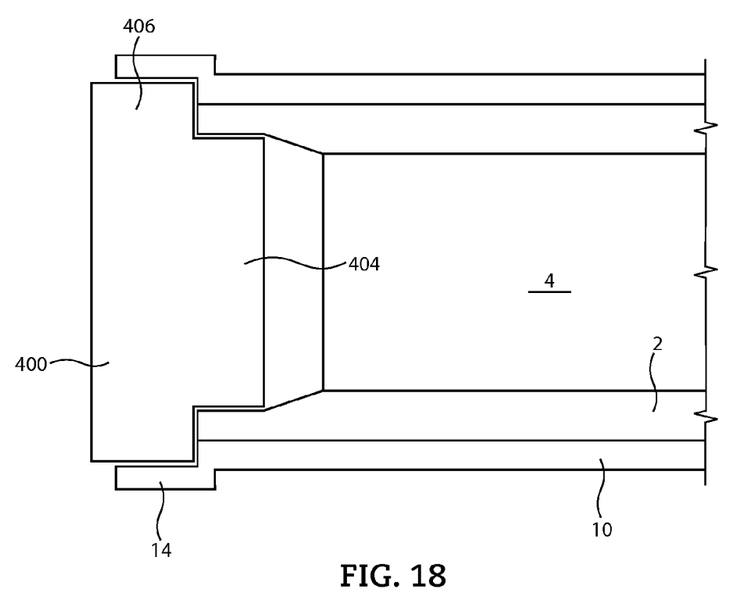

As illustrated in FIG. 18, the outer polymer layer 10 can be applied to the substrate 2 and along an outer surface of the second portion 406 of the plug 400. In particular embodiments, the outer polymer layer 10 can be applied in a continuous process, i.e., the outer polymer layer 10 is seamless along a length of the substrate 2. This may be carried out by extruding, coating, or any other suitable method known in the art. The outer polymer layer 10 can be cured following application in order to ensure a proper seal effectiveness of the outer polymer layer 10. A person of ordinary skill will understand that the overhang feature 14 can be formed using other suitable methods, such as, for example, independently shaping the outer polymer layer and then inserting the substrate into the outer polymer layer, or heating a cylindrical outer polymer layer and pressing, bending, or otherwise shaping an end portion of the outer polymer layer so as to form an overhang portion.

Referring again to FIG. 1, in particular embodiments, the overhang feature 14 and the engagement feature 16 can each extend longitudinally from axial ends 6 and 8 of the substrate 2, a distance 22 and 24, respectively. In particular embodiments, distance 24 can be no greater than distance 22. For example, a ratio of distance 24 to distance 22 can be no greater than 1:1, such as no greater than 1:0.99, no greater than 1:0.95, no greater than 1:0.9, or even no greater than 1:0.75. In further embodiments, the ratio of distance 24 to distance 22 can be no less than 1:0.1, such as no less than 1:0.25, or even no less than 1:0.5. Moreover, the ratio of distance 24 to distance 22 can be within a range between and including any of the values described above, such as, for example, between 1:0.9 and 1:1.

The outer polymer layer 10 can have a length 26 and the substrate 2 can have a length 28. In particular embodiments, the length 28 of the substrate 2 can be no greater than the length 26 of the outer polymer layer 10. For example, a ratio of length 28 to length 26 can be no greater than 1:1, such as no greater than 1:1.01, no greater than 1:1.05, or even no greater than 1:1.1. In further embodiments, the ratio of length 28 to length 26 can be no less than 0.75:1, such as no less than 0.8:1, or even no less than 0.85:1. Moreover, the ratio of length 28 to length 26 can be within a range between and including any of the values described above, such as, for example, between 1:1 and 1:1.05.

In particular embodiments, the overhang feature 14 can have an inner diameter 18 that is no less than an outer diameter 20 of the outer polymer layer 10. For example, a ratio of the inner diameter 18 of the overhang feature 14 to the outer diameter 20 of the outer polymer layer 10 can be at least 1:1, such as at least 1:1.001, at least 1:1.002, at least 1:1.005, or even at least 1:1.01. In further embodiments, the ratio of the inner diameter 18 of the overhang feature 14 to the outer diameter 20 of the outer polymer layer 10 can be no greater than 1:1.2, no greater than 1:1.1, no greater than 1:1.07, or even no greater than 1:1.06. Moreover, the ratio of the inner diameter 18 of the overhang feature 14 to the outer diameter 20 of the outer polymer layer 10 can be within a range between and including any of the values described above, such as, for example, between 1:1 and 1:1.01. In such a manner, the overhang feature 14 can radially overlap an outer.

In further embodiments, the overhang feature 14 can have a tapered surface such that the inner diameter 18 is less at a location adjacent to the axial end 6 as compared to a distal end of the overhang feature 14 at a location opposite the axial end 6. A portion of the overhang feature 14 disposed at a location adjacent to the axial end 6 can have an inner diameter equal to, or slightly smaller than, the outer diameter 20 of the outer polymer layer 10. In this regard, the overhang feature of a first tubular can more easily be installed around the outer polymer layer of a second tubular. When viewed in cross section, the tapered surface of the overhang feature can extend along a straight line. Alternatively, when viewed in cross section, the tapered surface of the overhang feature can be arcuate or stepped, i.e., the overhang feature has straight segments disposed at relative angles to one another.

An outer surface 30 of the engagement feature 16 can include an engagement component 32. An inner surface 34 of the substrate 2 can include an engagement component 36 complementary to the engagement component 32. The engagement components 32 and 36 are preferably threaded. However, the engagement components 32 and 36 can alternatively include any engagement components, such as, for example, complementary components for a bayonet connection, a cotter pin connection, a spring loaded key connection, or any combination thereof. As will be discussed in greater detail, the engagement components 32 and 36 can be coupled together to secure adjoining tubulars in axial alignment.

As illustrated in FIG. 1, the engagement component 36 can be disposed along an inner surface 34 having a radius greater than a radius of a wall of the axial bore 4. In alternate embodiments, the inner surface 34 can have the same radius as the wall of the axial bore 4. However, as a person of ordinary skill will understand, by having an inner surface 34 with a greater radius than the radius of the wall of the axial bore 4, the engagement feature 16 of an adjacent tubular 1 can be radially recessed so as to form a relatively flush surface of the inner axial bore 4 (see, for example, FIG. 2). This can reduce fluid impedance along the axial bore 4.

Figure 2:
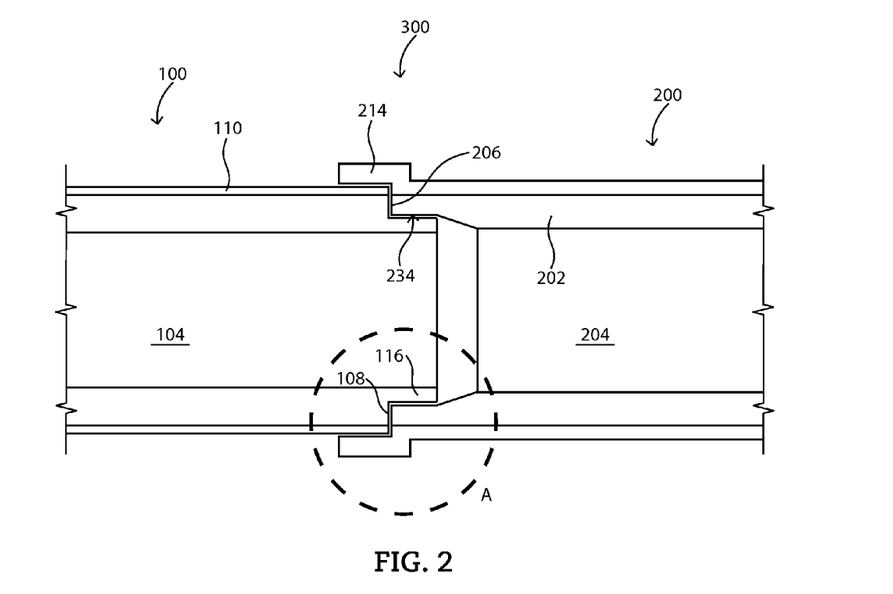
FIG. 2 includes a cross-sectional side view of a tubular assembly in accordance with an embodiment.

As illustrated in FIG. 2, a tubular assembly 300 can be formed by coupling a first tubular 100 to a second tubular 200. The first and second tubulars 100 and 200 can each have any number of features as described above, such as for example, a substrate and an outer polymer layer, an engagement feature and an overhang feature.

Figure 3:
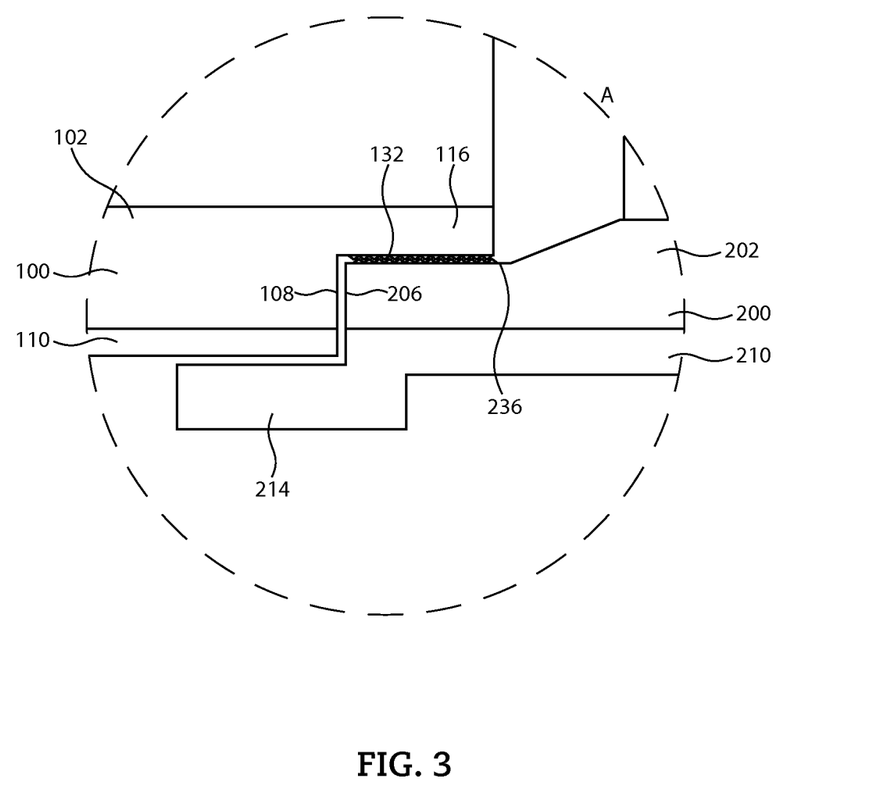
FIG. 3 includes an enlarged cross-sectional side view of a tubular assembly in accordance with an embodiment, as seen along Circle A in FIG. 2.

Referring now to FIGS. 2 and 3, an engagement feature 116 of the first tubular 100 can be axially aligned with an inner surface 234 of a substrate 202 of the second tubular 200. Simultaneously, an overhang feature 214 of the second tubular 200 can be axially aligned with an outer surface of an outer polymer layer 110 of the first tubular 100. After being positioned in axial alignment, the tubulars 100 and 200 can be urged together until an axial end 108 of the first tubular 100 contacts, or nearly contacts, an axial end 206 of the second tubular 200. In such a manner, the tubulars 100 and 200 can be joined to permit fluid communication between the axial bores 104 and 204 while simultaneously preventing the ingress of an external fluid into the axial bores 104 and 204 of the tubular assembly 300. In particular embodiments, the tubulars 100 and 200 can be rotated during axial translation so as to secure an engagement component 132 of the first tubular 100 with an engagement component 236 of the second tubular 200.

Figure 4:
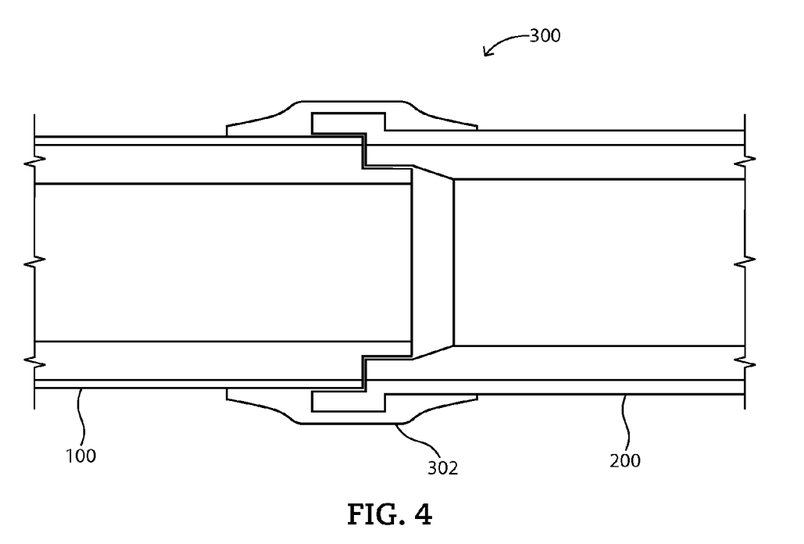
FIG. 4 includes a cross-sectional side view of a tubular assembly in accordance with an embodiment.

As illustrated in FIG. 4, the tubular assembly 300 can further include an outer material 302. The outer material 302 can be a shrink wrap, or other sealing material adapted to further enhance the sealing characteristics of the tubular assembly 300. The outer material 302 can be partially installed around the tubular assembly 300 prior to engagement of the first and second tubulars 100 and 200. Thereafter, the outer material 302 can be acted upon, e.g., heated, in order to further seal the tubular assembly 300. As illustrated in FIG. 4, the outer material 302 is shown exaggerated in size. In practice, the outer material 302 may form a flush, or nearly flush, radial extension from the tubular assembly 300.

Figure 5:
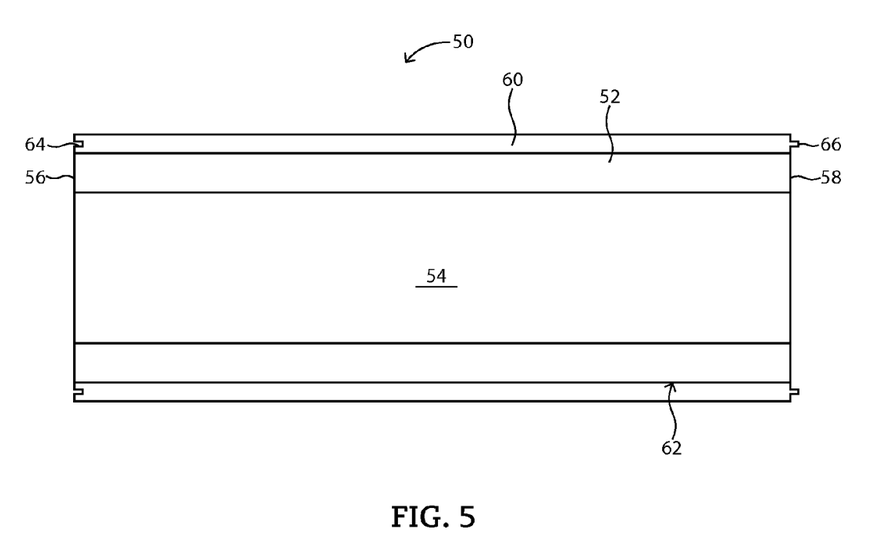
FIG. 5 includes a cross-sectional side view of a tubular in accordance with an embodiment.
Figure 6:
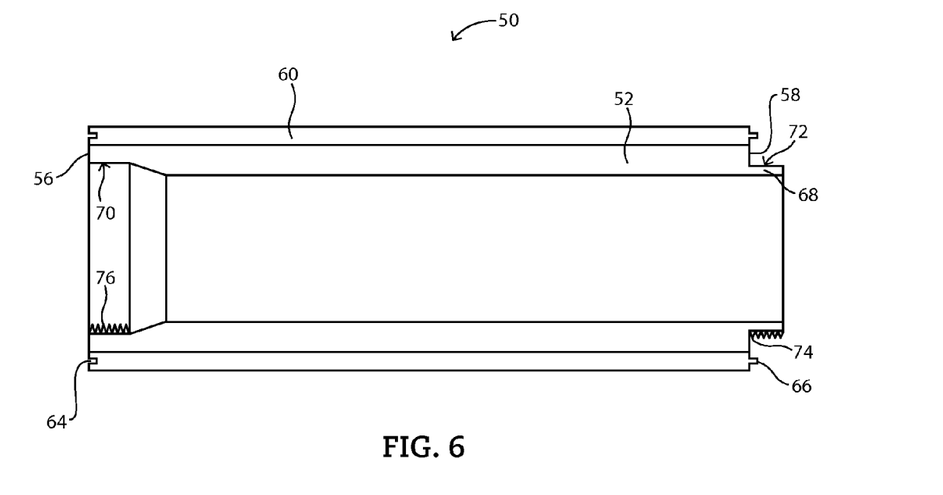
FIG. 6 includes a cross-sectional side view of a tubular in accordance with an embodiment.

Referring now to FIG. 5, in another aspect, a tubular 50 can generally include a substrate 52 having an axial bore 54 extending between opposing axial ends 56 and 58 thereof, and an outer polymer layer 60 disposed on an outer surface 62 of the substrate 52. The outer polymer layer 60 can extend between, and terminate flush, or nearly flush, with axial ends 56 and 58 of the substrate 52. A first complementary engagement feature 64 can be disposed along the outer polymer layer 60 at axial end 56 and a second complementary engagement feature 66 can be disposed along the outer polymer layer 60 at axial end 58. The complementary engagement features 64 and 66 can be shaped to correspondingly engage. For example, as illustrated in FIGS. 5 and 6, the complementary features 64 and 66 can comprise a tongue and groove. In this regard, complementary engagement feature 64 can be a tongue and complementary engagement feature 66 can be a groove.

Referring specifically to FIG. 6, in a further embodiment, the tubular 50 can include an engagement feature 68 extending from the axial end 58 of the substrate 52. Similar to the engagement feature 16 described above, with respect to FIGS. 1 to 3, an outer surface 72 of the engagement feature 68 can include an engagement component 74. An inner surface 70 of the substrate 2 can include an engagement component 76 complementary to the engagement component 74. The engagement components 74 and 76 are preferably threaded. However, the engagement components 74 and 76 can alternatively include any engagement component, such as, for example, complementary components for a bayonet connection, a cotter pin connection, a spring loaded key connection, or any combination thereof. The engagement components 74 and 76 of adjacent tubulars 50 can be coupled together to secure adjoining tubulars.

Figure 7:
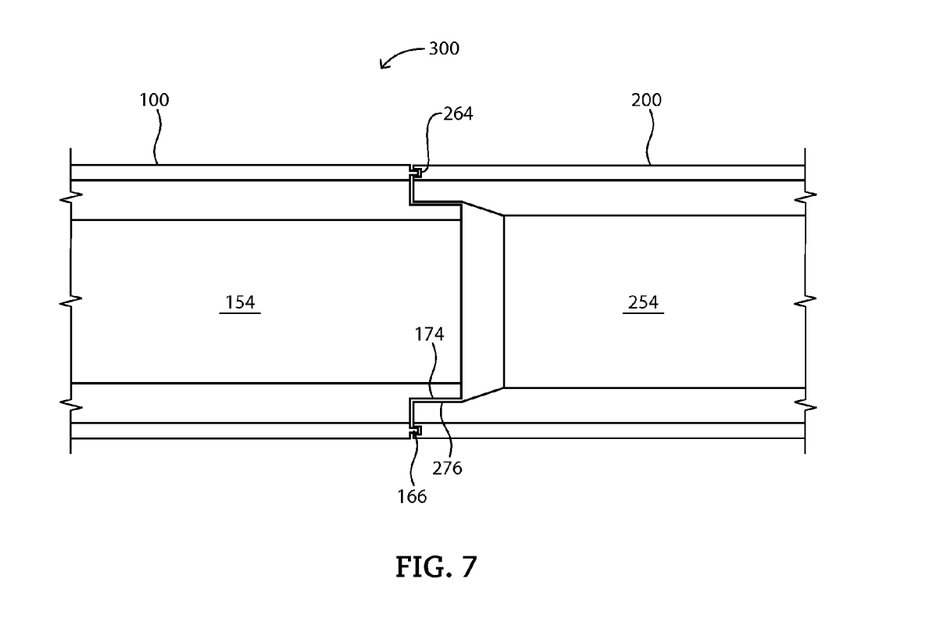
FIG. 7 includes a cross-sectional side view of a tubular assembly in accordance with an embodiment.

As illustrated in FIG. 7, as the engagement components 174 and 276 of adjacent tubulars 100 and 200 are coupled together, the first and second complementary engagement features 166 and 264 can be brought into communication. In this regard, securing the engagement components 174 and 276 together can fluidly seal the first and second complementary engagement features 264 and 166 together so as to prevent the ingress of an external fluid into the axial bores 154 and 254 of the tubular assembly 300.

Figure 8:
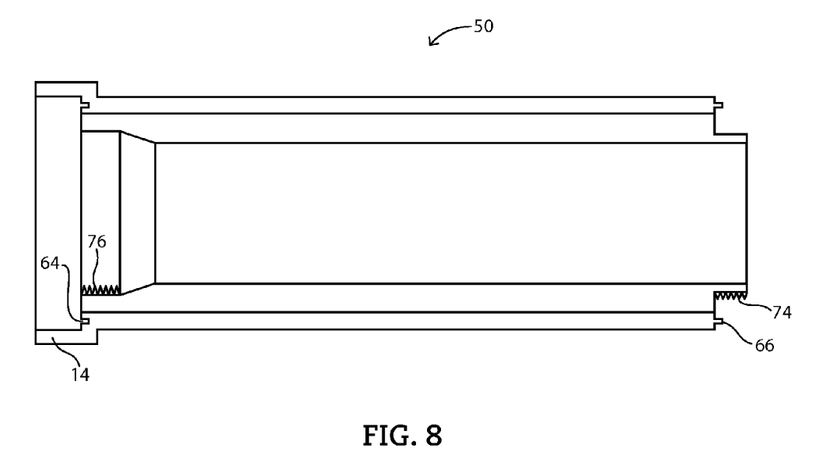
FIG. 8 includes a cross-sectional side view of a tubular in accordance with an embodiment.

Referring to FIG. 8, in yet a further embodiment, the tubular 50 can include engagement components 74 and 76, first and second complementary engagement features 64 and 66, and an overhang portion 14. In this regard, the tubular 50 can include two sealing portions—the polymer-to-polymer overlapping sealing feature formed by overhang portion 14, and the polymer-to-polymer joint formed by the first and second complementary engagement features 64 and 66.

Figure 9:
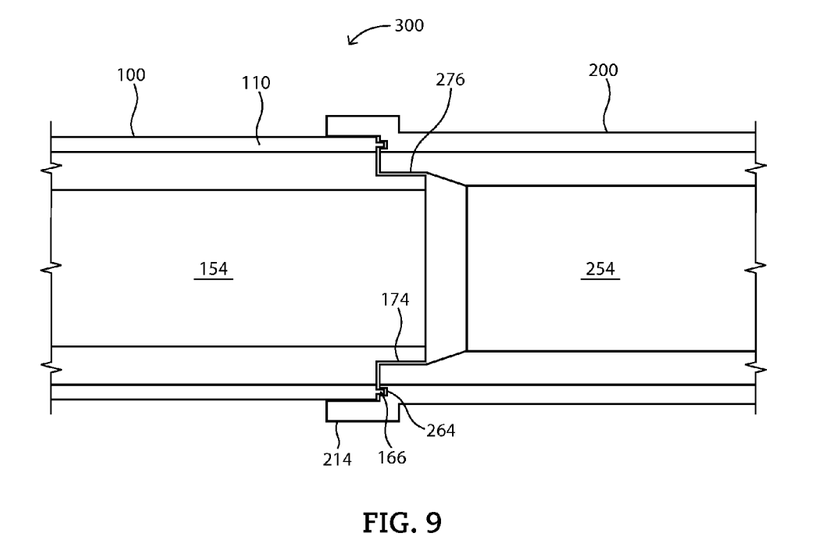
FIG. 9 includes a cross-sectional side view of a tubular assembly in accordance with an embodiment.

As illustrated in FIG. 9, as the engagement components 174 and 276 of adjacent tubulars 100 and 200 are coupled together, the first and second complementary engagement features 166 and 264 can be brought into communication while the overhang portion 214 of the second tubular 200 is simultaneously secured against an outer surface of the outer polymer layer 110 of the first tubular 100. In this regard, securing the engagement components 174 and 276 together can fluidly seal the first and second complementary engagement features 264 and 166 together as well as secure the overhang portion 214 to the outer polymer layer 110 so as to prevent the ingress of a fluid into the axial bores 154 and 254 of the tubular assembly 300.

Figure 10:
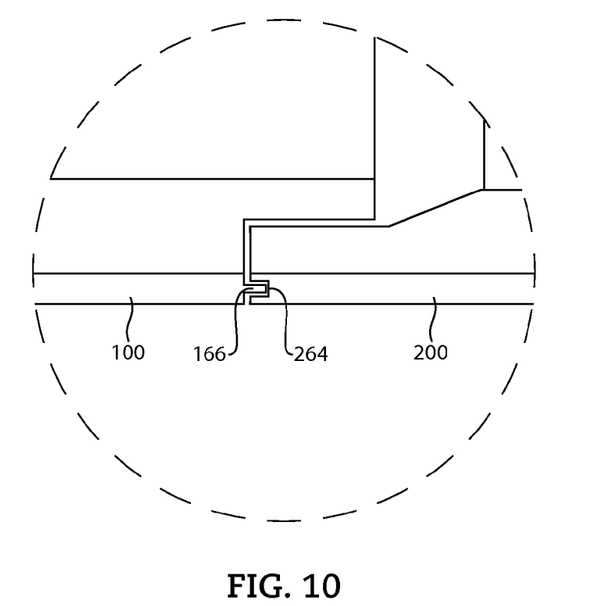
FIGS. 10 to 15 include enlarged cross-sectional side view of a tubular assembly in accordance with embodiments herein, as seen along Circle A in FIG. 2.
Figure 11:
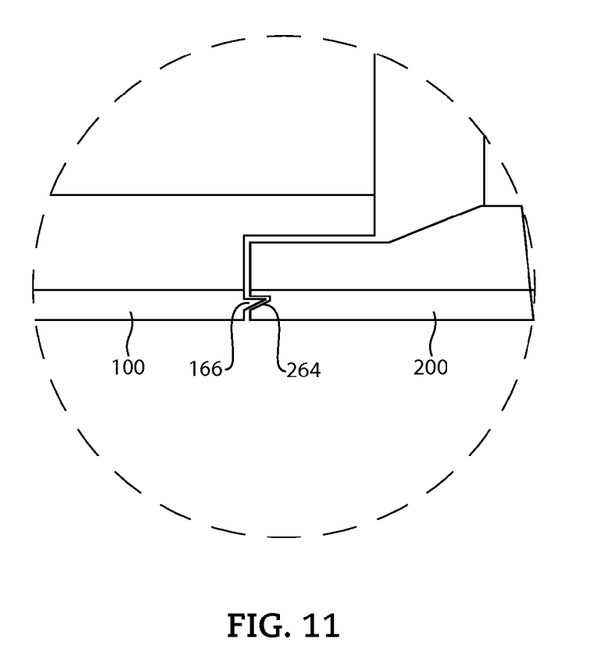
Figure 12:
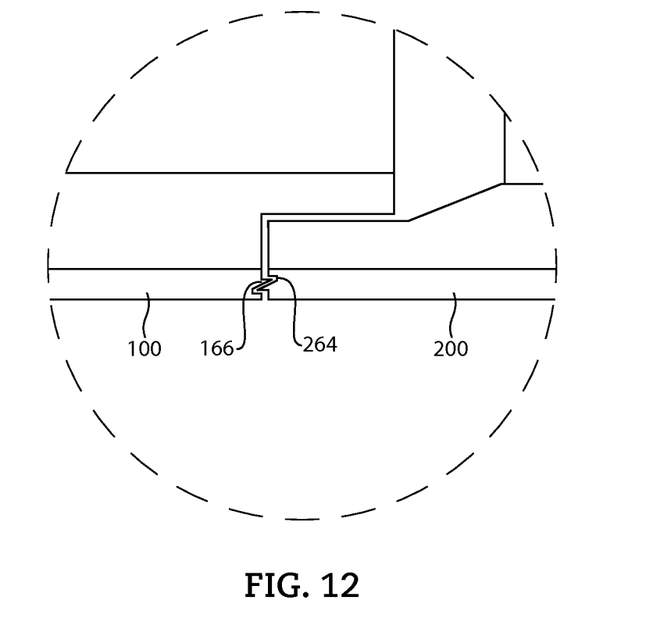
Figure 13:
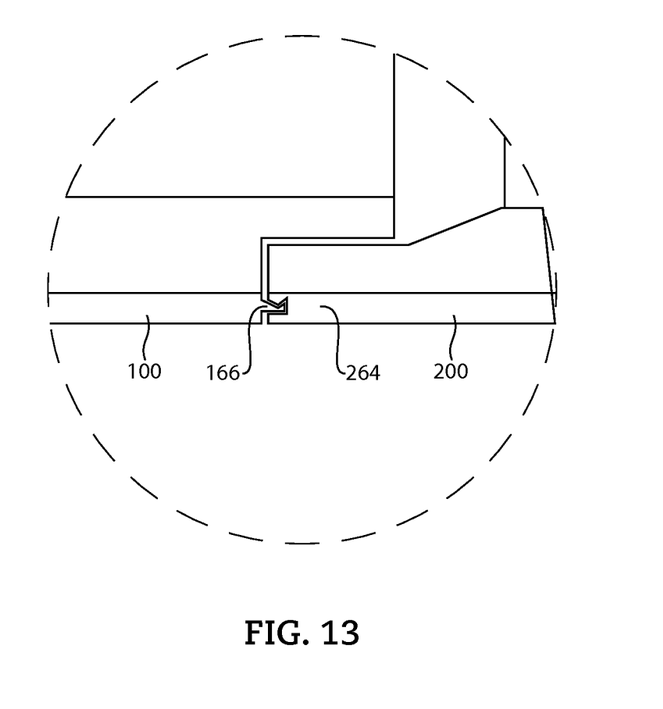
Figure 14:
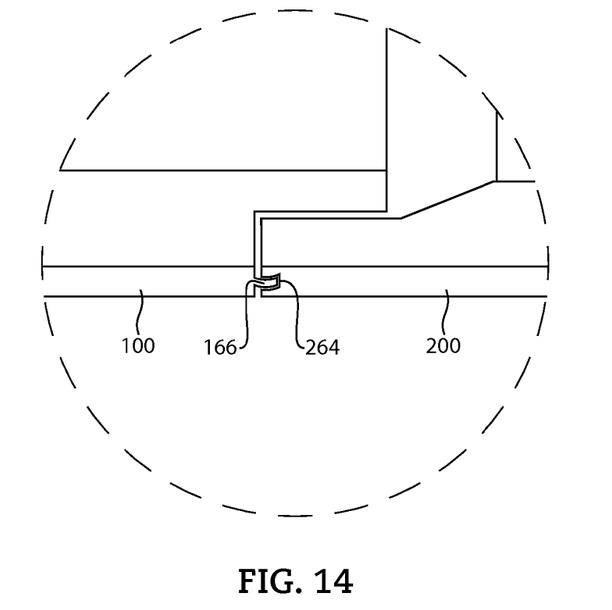
Figure 15:
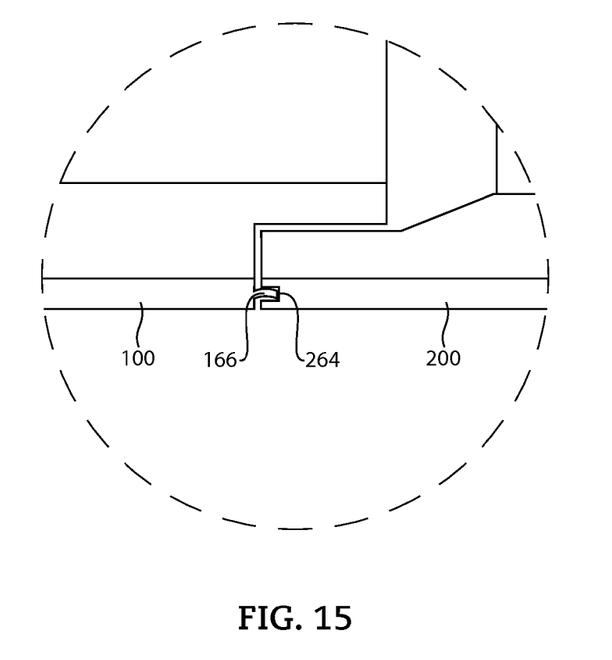

FIGS. 10 to 15 illustrate various embodiments of the first and second complementary engagement features 264 and 166. In an embodiment, the complementary engagement features 264 and 166 can comprise polygonal-shaped tongue and grooves (FIG. 10). In another embodiment, the complementary engagement features 264 and 166 can comprise a wedge-shaped tongue and a wedge-shaped groove (FIG. 11). In further embodiments, the complementary engagement features 264 and 166 can comprise a double wedge-shaped tone and a double wedge shaped groove (FIG. 12). In yet another embodiment, the complementary engagement features 264 and 166 can comprise a K-shaped tongue and a K-shaped groove (FIG. 13). In yet a further embodiment, the complementary engagement features 264 and 166 can comprise a generally curved tongue and a rectangular groove (FIG. 14). In yet another embodiment, the complementary engagement features 264 and 166 can comprise a generally curved tongue and a generally curved groove (FIG. 15). The above described embodiments are exemplary and are not intended to be limited. Moreover, a person of ordinary skill will understand that the complementary engagement features 264 and 166 can comprise any combination of the above described embodiments.

Figure 19:
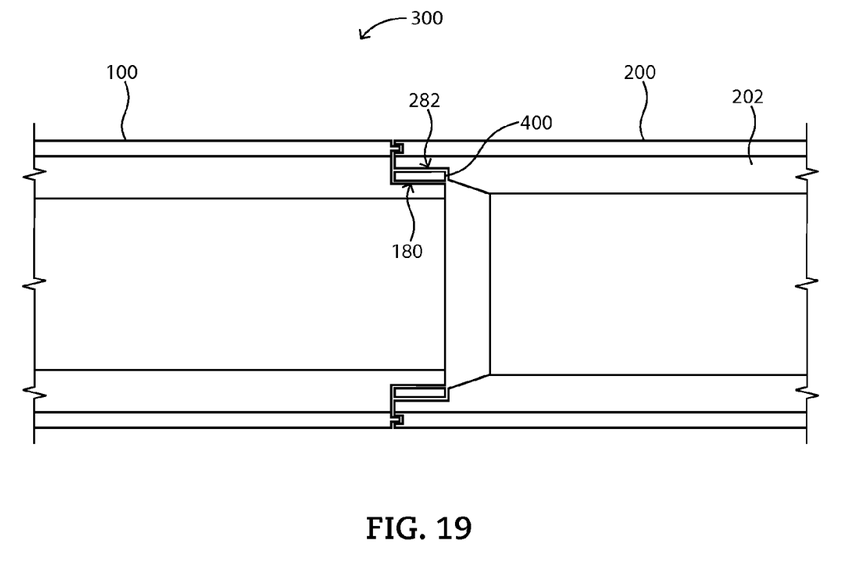
FIG. 19 includes a cross-sectional side view of an annular member disposed within the tubular assembly in accordance with an embodiment.

In a further embodiment, as illustrated in FIG. 19, an at least partially annular member 400, e.g., a ring, can be disposed in the tubular assembly 300. The annular member 400 can be disposed between radial surfaces 180 and 282 of the first and second tubulars 100 and 200, respectively, in such a manner so as to form a seal between the substrates 102 and 202 of the first and second tubulars 100 and 200, respectively. In certain embodiments, the annular member 400 can be recessed into the substrate 202 of the second tubular 200. This may permit a flush seal between the first and second tubulars 100 and 200. Of course, the annular member can also be recessed into the substrate of the first tubular.

The annular member 400 can enhance the seal formed between the first and second tubulars 100 and 200 by creating an additional sealing interface therebetween.

The annular member 400 can comprise a polymer, such as, for example, a fluoropolymer. Exemplary fluoropolymers may include a perfluoroalkoxy alkane (PFA), a polytetrafluoroethylene (PTFE), a polypropylene (PP), a fluorinated ethylene propylene (FEP), an ethylene-tetrafluoroethylene (ETFE), a poly-tetrafluoroethylene-perfluoropropylvinylether (MFA), a polyvinylidene fluoride (PVDF), an ethylene chlorotrifluoroethylene (ECTFE), a polychlorotrifluoroethylene (PCTFE), a tetrafluoroethylene-hexafluoropropylene-vinylidene fluoride (THV), or any combination thereof.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A tubular comprising:
a substrate having a first end, a second end, and an axial bore extending between the first and second ends; and
an outer polymer layer disposed on the substrate, wherein a first axial end of the outer polymer layer extends beyond the first end of the substrate.

Item 2. A tubular assembly comprising:
a first tubular in axial alignment with a second tubular, the first and second tubulars each comprising a substrate having an axial bore and an outer polymer layer,
wherein the outer polymer layer of the first tubular contacts the outer polymer layer of the second tubular to form a seal, wherein the seal is adapted to prevent ingress of an external fluid into the tubular assembly, and wherein the tubular assembly is adapted to be deployed in an environment having an external pressure greater than a pressure internal thereto.

Item 3. A tubular assembly comprising:
a plurality of tubulars disposed in axial alignment, each tubular comprising:
a substrate having a first end, a second end, and an axial bore extending between the first and the second ends; and
an outer polymer layer,
wherein each tubular has an average outer diameter, $OD_{AVG}$, wherein each tubular has a maximum outer diameter, $OD_{MAX}$, and wherein $OD_{MAX}$ is between about 1.0 $OD_{AVG}$ and about 1.1 $OD_{AVG}$.

Item 4. A tubular assembly comprising:
a plurality of tubulars disposed in axial alignment, each tubular comprising:
a substrate having a first end, a second end, and an axial bore extending between the first and second ends; and
an outer polymer layer,
wherein the axial bores of adjacent tubulars are in fluid communication; and
a heating member disposed in the axial bore of at least one of the tubulars.

Item 5. The tubular assembly according to any one of items 3 and 4, wherein the outer polymer layers of adjacent tubulars form a seal adapted to prevent ingress of an external fluid into the tubular assembly.

Item 6. The tubular assembly according to any one of items 2 or 5, wherein the seal has a seal effectiveness that increases as a pressure external to the tubular assembly increases relative to an internal pressure within the tubular assembly.

Item 7. The tubular assembly according to any one of items 2, 5, or 6, wherein the seal is formed by a first complementary engagement feature disposed on the outer polymer layer of a tubular and a second complementary engagement feature disposed on the outer polymer layer of an adjacent tubular.

Item 8. The tubular assembly according to any one of items 2 or 5-7, wherein the seal comprises overlapping outer polymer layers of adjacent tubulars.

Item 9. A method of manufacturing a tubular comprising:
  installing a plug on a distal end of a tubular substrate, the plug comprising a body having a first longitudinal portion and a second longitudinal portion, the first longitudinal portion having an outer diameter receivable in the tubular, and the second longitudinal portion having an outer diameter greater than the outer diameter of the tubular substrate;
  applying a continuous polymer layer to an exterior surface of the tubular substrate and along at least a portion of an exterior surface of the outer diameter of the second portion of the plug; and
  removing the plug from the tubular.

Item 10. The method according to item 9, wherein installing the plug is performed by rotating a threaded portion of the plug on a threaded portion of the distal end of the tubular.

Item 11. The method according to item 9, wherein installing the plug is performed by longitudinally sliding the plug on the distal end of the tubular.

Item 12. The method according to any one of items 9-11, wherein applying the continuous polymer layer is performed by extruding.

Item 13. The method according to any one of items 9-11, wherein applying the continuous polymer layer is performed by coating.

Item 14. The method according to any one of items 9-13, further comprising:
  forming a first complementary engagement feature on a first axial end of the continuous polymer layer.

Item 15. The method according to any one of items 9-14, further comprising:
  forming a second complementary engagement feature on a second axial end of the continuous polymer layer.

Item 16. The method according to any one of items 9-15, further comprising:
  curing the continuous polymer layer.

Item 17. A method to extract oil from a subterranean formation comprising:
  connecting at least two tubulars each having a substrate with an axial bore and an outer polymer layer disposed on the substrate such that the outer polymer layers of adjacent tubulars contact to form a seal;
  deploying a heating member within the axial bore of at least one of the tubulars; and
  energizing the heating member to reduce a viscosity of a subterranean fluid.

Item 18. The method according to item 17, wherein providing at least two tubulars comprises providing at least three tubulars, at least five tubulars, at least ten tubulars, at least twenty tubulars, or at least fifty tubulars.

Item 19. The method according to any one of item 17 or 18, wherein forming the seal is performed such that there is an outer-polymer-layer-to-outer-polymer-layer overlap.

Item 20. The method according to any one of items 17-19, wherein forming the seal is performed such that a first complementary engagement feature on a first tubular engages with a second complementary engagement feature on a second tubular.

Item 21. The method according to any one of items 17-20, further comprising:
  extracting the subterranean fluid.

Item 22. The method, tubular, or tubular assembly according to any one of the preceding items, wherein the substrate comprises a metal.

Item 23. The method, tubular, or tubular assembly according to any one of the preceding items, wherein the substrate comprises aluminum.

Item 24. The method, tubular, or tubular assembly according to any one of the preceding items, wherein the outer polymer layer is monolithic.

Item 25. The method, tubular, or tubular assembly according to any one of the preceding items, wherein the outer polymer layer is a fluid barrier.

Item 26. The method, tubular, or tubular assembly according to any one of the preceding items, wherein the outer polymer layer comprises a thermoplastic.

Item 27. The method, tubular, or tubular assembly according to any one of the preceding items, wherein the outer polymer layer comprises a plasticizer.

Item 28. The method, tubular, or tubular assembly according to any one of the preceding items, wherein the outer polymer layer comprises a polymer, a polymer blend or a copolymer.

Item 29. The method, tubular, or tubular assembly according to any one of the preceding items, wherein the outer polymer layer comprises a fluoropolymer.

Item 30. The method, tubular, or tubular assembly according to any one of the preceding items, wherein the outer polymer layer comprises a fluorinated ethylene propylene (FEP).

Item 31. The method, tubular, or tubular assembly according to any one of the preceding items, wherein the outer polymer layer comprises a perfluoroalkoxy alkane (PFA).

Item 32. The method, tubular, or tubular assembly according to any one of the preceding items, wherein the outer polymer layer comprises a polytetrafluroethylene (PTFE).

Item 33. The method, tubular, or tubular assembly according to any one of the preceding items, wherein the outer polymer layer comprises a polypropylene (PP).

Item 34. The method, tubular, or tubular assembly according to any one of the preceding items, wherein the outer polymer layer comprises a relatively uniform thickness.

Item 35. The method, tubular, or tubular assembly according to any one of the preceding items, wherein the outer polymer layer comprises a uniform thickness.

Item 36. The method, tubular, or tubular assembly according to any one of the preceding items, wherein the outer polymer layer has a length, $L_{OPL}$, wherein the substrate has a length, $L_S$, and wherein $L_S$ is not greater than $L_{OPL}$.

Item 37. The method, tubular, or tubular assembly according to any one of the preceding items, wherein the outer polymer layer has an average thickness, $T_{OPL}$, as measured in a radial direction, wherein the substrate has an average thickness, $T_S$, as measured in a radial direction, and wherein $T_S$ is greater than $T_{OPL}$.

Item 38. The method, tubular, or tubular assembly according to item 37, wherein $T_{OPL}$ is no less than 0.1 mm, no less than 1.0 mm, or no less than 5.0 mm Item 39. The method, tubular, or tubular assembly according to any one of items 37 or 38, wherein $T_{OPL}$ is no greater than 10 cm, no greater than 5 cm, or no greater than 1 cm.

Item 40. The method, tubular, or tubular assembly according to any one of items 37-39, wherein $T_S$ is no less than 0.1 mm, no less than 1.0 mm, or no less than 5.0 mm Item 41. The method, tubular, or tubular assembly according to any one of items 37-40, wherein $T_S$ is no greater than 50 cm, no greater than 25 cm, or no greater than 10 cm.

Item 42. The method, tubular, or tubular assembly according to any one of the preceding items, wherein the outer polymer layer has a first complementary engagement feature at a first axial end, and a second complementary engagement feature at a second axial end.

Item 43. The method, tubular, or tubular assembly according to item 42, wherein the first complementary engagement feature is for complementary engagement with the second complementary engagement feature.

Item 44. The method, tubular, or tubular assembly according to any one of items 42 or 43, wherein the first complementary engagement feature comprises a tongue, and the second complementary feature comprises a groove.

Item 45. The method, tubular, or tubular assembly according to any one of items 42-44, wherein the first complementary engagement feature comprises a polygonal-shaped tongue, and the second complementary feature comprises a polygonal-shaped groove.

Item 46. The method, tubular, or tubular assembly according to any one of items 42-45, wherein the first complementary engagement feature comprises a wedge-shaped tongue, and the second complementary feature comprises a wedge-shaped groove.

Item 47. The method, tubular, or tubular assembly according to any one of items 42-46, wherein the first complementary engagement feature comprises a double wedge-shaped tongue, and the second complementary feature comprises a double wedge-shaped groove.

Item 48. The method, tubular, or tubular assembly according to any one of items 42-45, wherein the first complementary engagement feature comprises a K-shaped tongue, and the second complementary feature comprises a K-shaped groove.

Item 49. The method, tubular, or tubular assembly according to any one of items 42-44, wherein the first complementary engagement feature comprises a generally curved tongue, and the second complementary feature comprises a rectangular groove.

Item 50. The method, tubular, or tubular assembly according to any one of items 42-44, wherein the first complementary engagement feature comprises a generally curved tongue, and the second complementary feature comprises a generally curved groove.

Item 51. The tubular assembly according to any one of items 2-8, further comprising a ring adapted to be disposed radially between a portion of the first tubular and a portion of the second tubular.

Item 52. The tubular assembly according to item 51, wherein the ring comprises a polymer, such as a fluoropolymer.

Item 53. The tubular of item 1, wherein the portion of the outer polymer layer that extends beyond the first end of the substrate has a tapered surface.

Item 54. A tubular assembly comprising a first tubular and a second tubular detachably coupled to one another at an interface, wherein the tubular assembly is adapted to have an internal seal effectiveness of at least 200 PSI, such as at least 250 PSI, or even at least 300 PSI, and an external seal effectiveness of at least 200 PSI, such as at least 250 PSI, or even at least 300 PSI, as measured according to the Seal Effectiveness Test.

Item 55. The tubular assembly according to item 54, wherein the first tubular is threadedly coupled to the second tubular.

Item 56. The tubular assembly according to item 54, wherein the internal and external seal effectiveness are as measured when the first and second tubulars are partially unthreaded such that an axial end of a substrate of the first tubular is spaced apart from an axial end of a substrate of the second tubular by 0.5 mm

EXAMPLES

The Seal Effectiveness Test in a pipe coupling assembly is a measure of the pressure the pipe coupling can withstand without exhibiting fluid leakage through the coupling itself. To test internal seal effectiveness in a pipe coupling assembly two longitudinal sections of pipe are joined together via a pipe coupling technique. The internal bore of the pipes are then pressurized by a fluid and the external area surrounding the pipe coupling is monitored for leakage. Occurrence of leakage indicates the pipe coupling is ineffective at the tested pressure.

To test for external seal effectiveness in a pipe coupling assembly two longitudinal sections of pipe are jointed together via a pipe coupling technique. The pipe coupling assembly is inserted into an enclosure such that the joint between the pipes is fully enclosed within the enclosure. The cavity between the sleeve and the pipe is then pressurized with a fluid and the internal area of the pipes is monitored for leakage. Occurrence of leakage indicates the pipe coupling is ineffective at the tested pressure.

A pipe coupling as described in accordance with an embodiment herein and as generally illustrated in FIG. 2 is tested for internal and external seal effectiveness. The substrate of the pipes is constructed from aluminum and the outer polymer layer is a PFA.

A first test of the external pressure seal effectiveness is conducted with the assembly as generally illustrated in FIG. 2 at an external pressure of 246 PSI. The first test is repeated several times. Between each test the pipe coupling assembly is reviewed and monitored for leakage. In preparing the first trial of the first test, the pipe coupling is fully screwed together and then slightly unthreaded, or "backed off," so that the longitudinal ends of the substrates are 0.5 mm apart. This permits observation of seal effectiveness by the outer polymer layer without significant assistance from the substrates. In a second trial of the first test, the pipe coupling is further backed off so that the longitudinal ends of the substrates are spaced apart by 10 mm. This ensures testing of the seal created by the outer polymer layer. In the first and second trials of the first test the internal bore of the pipes remained dry. That is, pipe couplings in accordance with one or more embodiments described herein have an external seal effectiveness of at least 304 PSI.

A second test of external pressure seal effectiveness is conducted using the same assembly, but further including an annular member positioned in the assembly as illustrated in FIG. 19. The pipes are fully screwed together unlike in the first test of external pressure such that the two pipes cannot be further threaded together by hand-generated force. A pressure of 304 PSI is applied externally to the pipe coupling assembly and maintained for a period of 10 minutes. The inner bore of the pipes remained dry.

A test of internal pressure seal effectiveness is then conducted using the same assembly as the second test described above. The bore of the pipes is pressurized by a fluid to a pressure of 304 PSI and maintained at 304 PSI for a period of 30 minutes. Upon completion of the 30 minute period, the outer surface of the pipe coupling remained dry.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A tubular comprising:
a substrate having a first end, a second end, and an axial bore extending between the first and second ends, wherein the substrate comprises a metal; and
a polymer layer disposed on an outer surface of the substrate, wherein a first axial end of the polymer layer extends beyond the first end of the substrate.

2. The tubular of claim 1, wherein the portion of the polymer layer that extends beyond the first end of the substrate has a tapered surface.

3. The tubular according to claim 1, wherein the polymer layer has a length, $L_{OPL}$, wherein the substrate has a length, $L_S$, and wherein $L_{OPL}$ is greater than $L_S$.

4. The tubular according to claim 1, wherein the polymer layer comprises a relatively uniform thickness.

5. The tubular of claim 1, wherein the polymer layer is disposed along the entire outer surface of the substrate.

6. The tubular of claim 1, wherein the tubular has an average outer diameter, $OD_{AVG}$, and a maximum outer diameter, $OD_{MAX}$, and wherein $OD_{MAX}$ is between 1.0 $OD_{AVG}$ and 1.1 $OD_{AVG}$.

7. The tubular of claim 1, wherein the polymer layer has an average thickness, $T_{OPL}$, as measured in a radial direction, wherein the substrate has an average thickness, $T_S$, as measured in the radial direction, and wherein $T_S$ is greater than $T_{OPL}$.

8. The tubular of claim 1, wherein the polymer layer has a first engagement feature at a first axial end and a second engagement feature at a second axial end, wherein the first engagement feature is adapted to engage with a second engagement feature of a second tubular, and wherein the second engagement feature is adapted to engage with a first engagement feature of a third tubular.

9. The tubular of claim 8, wherein the first engagement feature includes a tongue, and wherein the second engagement feature includes a groove.

10. The tubular of claim 9, wherein the tongue has a shape selected from the group consisting of a polygonal shape, a wedge shape, a double wedge shape, a K shape, and a curved shape.

11. The tubular of claim 1, wherein the polymer layer comprises a fluoropolymer.

12. The tubular of claim 1, wherein the polymer layer has a uniform thickness.

13. The tubular of claim 1, wherein the second end of the substrate extends beyond a second axial end of the polymer layer, and wherein the second axial end of the polymer layer is opposite the first axial end of the polymer layer.

14. A tubular comprising:
a substrate having a first end, a second end, and an axial bore extending between the first and second ends, wherein an inner surface of the substrate includes a plurality of threads; and
an outer polymer layer disposed on the substrate, wherein a first axial end of the outer polymer layer extends beyond the first end of the substrate, and wherein the outer polymer layer has a relatively uniform thickness.

15. The tubular of claim 14, wherein the outer polymer layer has an average thickness, $T_{OPL}$, as measured in a radial direction, wherein the substrate has an average thickness, $T_S$, as measured in the radial direction, and wherein $T_S$ is greater than $T_{OPL}$.

16. The tubular of claim 14, wherein the outer polymer layer has a first engagement feature at a first axial end and a second engagement feature at a second axial end, wherein the first engagement feature is adapted to engage with a second engagement feature of a second tubular, wherein the second engagement feature is adapted to engage with a first engagement feature of a third tubular, wherein the first engagement feature includes a tongue, and wherein the second engagement feature includes a groove.

17. The tubular of claim 14, wherein the substrate comprises a metal, wherein the polymer layer comprises a fluoropolymer, or a combination thereof.

18. The tubular of claim 14, wherein the second end of the substrate extends beyond a second axial end of the outer polymer layer, and wherein the second axial end of the outer polymer layer is opposite the first axial end of the outer polymer layer.

19. A tubular assembly comprising:
a first tubular comprising:
a substrate having a first end, a second end, and an axial bore extending between the first and second ends; and
an outer polymer layer disposed on the substrate, wherein:
a first axial end of the outer polymer layer extends beyond the first end of the substrate,
the outer polymer layer has a relatively uniform thickness,
the outer polymer layer has an engagement feature at a first axial end opposite the second axial end, and
the substrate has a plurality of threads at the first end; and
a second tubular comprising:
a substrate having a first end, a second end, and an axial bore extending between the first and second ends; and
an outer polymer layer disposed on the substrate, wherein:
a first axial end of the outer polymer layer extends beyond the first end of the substrate,
the outer polymer layer has a relatively uniform thickness,
the outer polymer layer has an engagement feature at a second axial end opposite the second axial end, and
the substrate has a plurality of threads at the second end,
wherein the plurality of threads of the first tubular is engaged with the plurality of threads of the second tubular, and wherein the engagement feature of the first tubular is engaged with the engagement feature of the second tubular.

20. The tubular assembly of claim 19, wherein the outer polymer layer of at least one of the first and second tubulars has a uniform thickness.

\* \* \* \* \*

UNITED STATES PATENT AND TRADEMARK OFFICE
CERTIFICATE OF CORRECTION

PATENT NO. : 9,488,303 B2
APPLICATION NO. : 14/643826
DATED : November 8, 2016
INVENTOR(S) : Yves Stefani et al.

Page 1 of 1

It is certified that error appears in the above-identified patent and that said Letters Patent is hereby corrected as shown below:

On the Title Page

Item (73), please insert --SAINT-GOBAIN PERFORMANCE PLASTICS FRANCE, Charny, FRANCE-- above "SAINT-GOBAIN PERFORMANCE PLASTICS CORPORATION, Solon, OH (US)"

Signed and Sealed this
Twenty-second Day of October, 2019

Andrei Iancu
*Director of the United States Patent and Trademark Office*